United States Patent
Senderek et al.

(10) Patent No.: US 10,992,785 B2
(45) Date of Patent: *Apr. 27, 2021

(54) MANAGING EDITS OF CONTENT ITEMS

(71) Applicant: Dropbox, Inc., San Francisco, CA (US)

(72) Inventors: Jan Senderek, San Francisco, CA (US); Daniel Tobias Wagner, San Francisco, CA (US); Leonard Fink, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/289,367

(22) Filed: Feb. 28, 2019

(65) Prior Publication Data

US 2019/0199831 A1 Jun. 27, 2019

Related U.S. Application Data

(63) Continuation of application No. 14/481,783, filed on Sep. 9, 2014, now Pat. No. 10,257,317.

(51) Int. Cl.
*H04L 29/06* (2006.01)
*H04L 29/08* (2006.01)

(52) U.S. Cl.
CPC .............. *H04L 67/42* (2013.01); *H04L 67/02* (2013.01); *H04L 67/306* (2013.01)

(58) Field of Classification Search
CPC ........ H04L 67/42; H04L 67/306; H04L 67/02
USPC ........................................................ 709/203
See application file for complete search history.

(56) References Cited

U.S. PATENT DOCUMENTS

| | | |
|---|---|---|
| 2009/0100096 A1 | 4/2009 | Erlichson et al. |
| 2010/0037267 A1 | 2/2010 | Bennett |
| 2013/0326333 A1 | 12/2013 | Hashmi |
| 2014/0095587 A1 | 4/2014 | Schult |
| 2014/0229866 A1 | 8/2014 | Gottlieb |
| 2016/0065687 A1 | 3/2016 | Velusamy et al. |
| 2016/0072922 A1 | 3/2016 | Senderek et al. |

OTHER PUBLICATIONS

U.S. Appl. No. 14/481,783, Apr. 5, 2016, Office Action.
U.S. Appl. No. 14/481,783, Nov. 8, 2016, Office Action.
U.S. Appl. No. 14/481,783, Dec. 26, 2018, Notice of Allowance.

*Primary Examiner* — Meng Vang
(74) *Attorney, Agent, or Firm* — Keller Jolley Preece

(57) ABSTRACT

One or more embodiments provide features for managing and editing content items. In particular, one or more embodiments enable one or more users to access and modify content items from one of multiple client devices without requiring storage of the content item locally on the client device. Additionally, one or more embodiments enable storing reduced resolution content items on multiple client devices in a way that saves storage space on the client devices while providing access to a content item without requiring constant network access to a central system. Further, one or more embodiments enable globally applying local edits to a content item and corresponding reduced resolution content items on multiple client devices.

20 Claims, 7 Drawing Sheets

MANAGING EDITS OF CONTENT ITEMS

CROSS REFERENCE TO RELATED APPLICATIONS

The present application is a continuation of U.S. application Ser. No. 14/481,783, filed Sep. 9, 2014. The aforementioned application is hereby incorporated by reference in its entirety.

BACKGROUND

1. Technical Field

One or more embodiments of the present disclosure relate generally to managing edits to one or more content items. More specifically, one or more embodiments of the present disclosure relate to providing access of a content item to a user and applying edits from the user to a content item.

2. Background and Relevant Art

Computing devices (e.g., computers, tablets, and smart phones) have created numerous ways for people to capture, create, share, view, and otherwise interact with content items. For example, computing devices allow users to interact with digital photos and digital videos by capturing, sharing, viewing, and editing digital photos and digital videos. To facilitate interaction with content items, many computing devices include editing and/or access tools for accessing and editing one or more content items, such as photos, videos, or other media files.

Nevertheless, accessing and editing content items suffers from a number of limitations and drawbacks. For example, computing devices often have space limitations that limit the number of content items that may be stored and/or maintained on a respective computing device. Limited space often diminishes the performance of the computing device and experience of a user. Furthermore, storing and/or editing multiple versions of a content item on a computing device may further present storage limitations on a computing device.

To reduce problems associated with storing and/or accessing content items, many computing systems remotely store and/or maintain content items on remote databases, servers, or other storage that is not local to the computing device. For example, rather than store all content items on a local computing device, a user may send one or more content items to a separate and/or remote system to maintain and provide access to the computing device without using local storage space on the computing device. Nevertheless, while storing content items on a remote system may save storage space on a computing device, many difficulties and inefficiencies persist in managing content items remotely.

For example, remotely storing content items often reduces accessibility to content items. For instance, where a network (e.g., Internet) is used to retrieve content items that are stored remotely, a user often experiences delays when accessing a particular content item. For example, due to limited bandwidth or the size of a content item, a user may spend a substantial amount of time retrieving a particular content item. Further, where a user does not have immediate access to the remote storage through the Internet or other network connection, accessing a content item may be impossible until a connection to the remote storage is secured. Thus, accessing and/or editing a content item using a remote storage generally requires reliable and/or constant access to the remote storage and often results in delays to a user when accessing the content item.

Additionally, one or multiple users often interact with content items using multiple computing devices. Further, where content items are remotely stored, multiple users often interact with and/or edit the same content item. In cases where multiple users edit a content item, the edits often result in ambiguous or inconsistent versions of the content item across multiple devices. Thus, remote storage systems often produce inconsistent copies of a content item where multiple users and/or devices are capable of interacting with a content item.

Accordingly, there are a number of considerations to be made in managing content items.

SUMMARY

Embodiments of the present disclosure provide benefits and/or solve one or more of the foregoing problems in the art with managing content items (e.g., photos, videos, audio). In accordance with one or more embodiments, the present disclosure includes features for managing one or more content items. In particular, a system can, according to principles described herein, receive a content item from a user and generate a plurality of reduced resolution content items corresponding to the content item. The system can further provide a user with access to the reduced resolution content items. Accordingly, a system can provide one or more reduced resolution content items to a user without requiring that the original content item be stored locally on a client device. Thus, a client device can utilize less local storage resources while allowing a user to access, edit, or otherwise interact with a content item by providing a reduced resolution content item.

In one example, a system can provide a user access to a plurality of reduced resolution content items corresponding to a content item. Further, a user may edit one of the reduced resolution content items (e.g., on a client device) and provide the edit to the system. The system can apply the edit to the content item and each of the plurality of reduced resolution content items associated with the content item. In this way, a user can edit a reduced resolution content item and the edit can be applied to the original content item and other reduced resolution content items without requiring that a user have local access to the original content item or store the original content item on a client device. Thus, a user can interact with a reduced resolution content item in a local environment and the edits can be applied globally to the content item and corresponding reduced resolution content items across multiple devices. In this way, content items can be effectively managed while saving storage on a client device.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
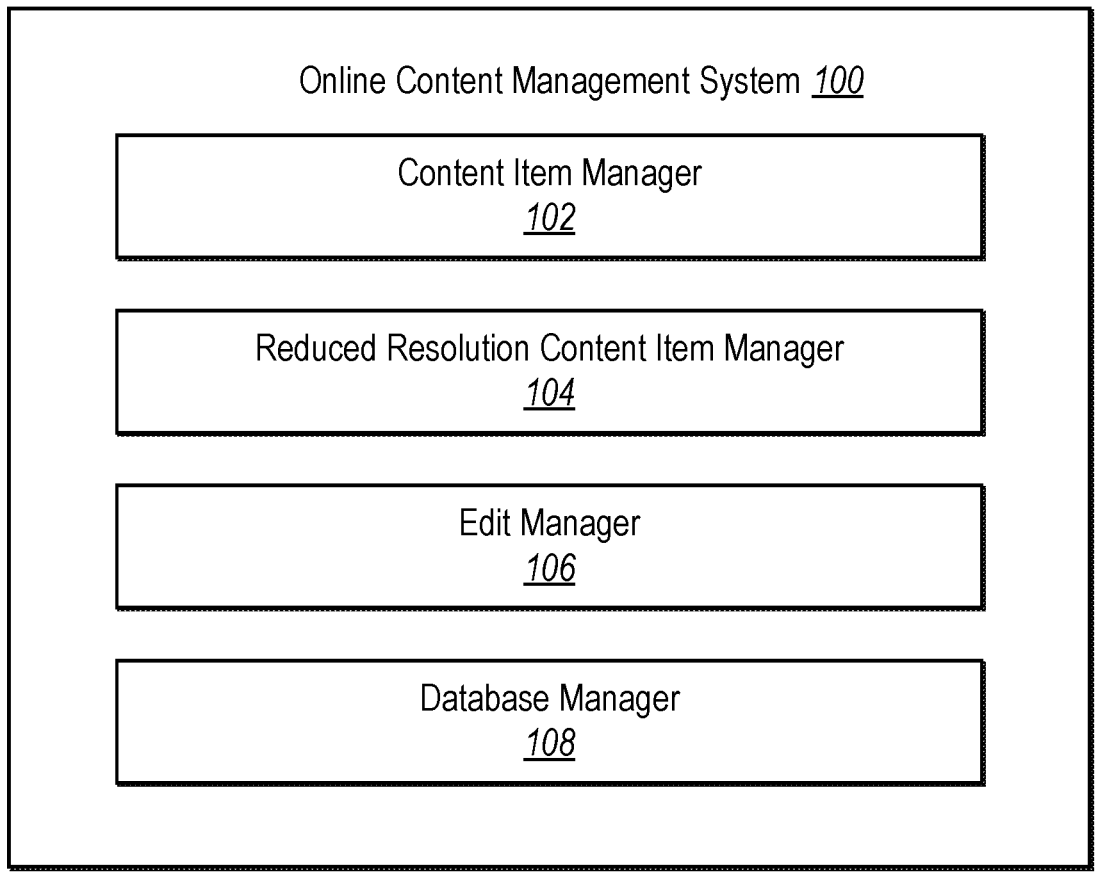
FIG. 1 illustrates a schematic diagram of a system for managing content items in accordance with one or more embodiments of the present disclosure.

One or more embodiments of the present disclosure facilitate the effective management of content items. In particular, one or more embodiments improve an experience of accessing and editing content items using a system that is non-native to a client device. For instance, a system can receive a content item from a client device and generate a plurality of reduced resolution content items corresponding to the content item. The system may further provide a user access to the reduced resolution content items. For example, a user can view, open, edit, or otherwise interact with the reduced resolution content items. In some embodiments, the user can interact with the reduced resolution content items as an alternative to locally storing the original content item and accessing the content item on a client device. Thus, a system can provide a user access to a reduced resolution content item on the system without requiring that the user maintain the original content item on a local client device.

Additionally, one or more embodiments can improve an experience of a user when editing a content item. For example a system may provide a user with access to the plurality of the reduced resolution content items corresponding to an original content item. Providing access may include enabling a user to modify or otherwise apply changes to a reduced resolution content item and provide an edit to the system. The system may receive the edit of the reduced resolution content item and apply the edit to the content item and each of the plurality of reduced resolution content items. In particular, the system can apply the edit to the original content item and each of the reduced resolution content items that are stored in a database and/or provided to one or more users (e.g., via multiple client devices). Thus, the system can apply edits across multiple reduced resolution content items maintaining consistency across each of the versions of a content item that are stored on a database and/or maintained on individual client devices. In this way, a user can edit a reduced resolution content item on a local client device without as many resources as would be required when editing an original content item. Additionally, by applying edits across the content item and multiple reduced resolution content items, the system can maintain consistency between versions of a content item and improve a user's experience with accessing and/or editing a content item.

As used herein, "content item" refers to any digital data. The terms "digital content item," "digital item," and "digital content" can include a data file. Examples of content items include, but are not limited to, digital photos, digital video files, digital audio files, document files of all times, streaming content, contact lists, and/or folders that include one or more digital content items. The term "digital content item," "digital item," and "digital content" may refer interchangeably to content items (e.g., thumbnail images representing content item) or reduced resolution content items. In addition, a collection of content items can include as few as one content item, but in many instances, a collection can include large numbers of content items. Although the present disclosure provides specific examples related to photos, one will appreciate that the principles described herein may be applied to any other type of content item.

A "reduced resolution content item" refers to any digital data representative of an original content item. Examples of reduced resolution content items include, but are not limited to, digital photos, digital video files, digital audio files, document files of all times, streaming content, contact lists, and/or folders that include one or more digital content items that represent a reduced version of an original content item. For instance, a reduced resolution content item can be a transcribed copy of an original content item having a lower resolution than the original content item. A plurality of reduced resolution content items can correspond to a single content item.

An "edit" can refer to any information associated with a modification, addition, deletion, or other change applicable to a content item or reduced resolution content item. As used herein, an edit can include, but is not limited to an indication of an edit, a description of an edit, or other information that can be used to apply an edit to a content item and/or a reduced resolution content item. For instance, an edit can include any information associated with a modification, deletion, addition, notation, or any change applied to a content item or reduced resolution content item. Additionally or alternatively, an edit can include a content item or reduced resolution content item with one or more modifications, additions, deletions, or other changes applied to the content item or reduced resolution content item.

FIG. 1 illustrates an example embodiment of digital content emphasis system 100 (or simply "system") in accordance with one or more principles described herein. As shown, system 100 includes content item manager 102, reduced resolution content item manager 104, edit manager 106, and database manager 108. Each of the components 102-108 of system 100 may be in communication with one another using any suitable communication technologies. It will be recognized that although components 102-108 are shown to be separate in FIG. 1, any of components 102-108 can be combined into fewer components, such as into a single component, or divided into more components as may serve a particular embodiment. Additionally, components 102-108 can be located on, or implemented by, one or more computing devices, such as those described below in relation to FIG. 6. Alternatively, portions of system 100 can be implemented on a client device, while other portions of system 100 can be implemented on an online content management system 100, such as described below in reference to FIG. 7.

Components 102-108 can comprise software, hardware, or a combination thereof. For example, components 102-108 can comprise one or more instructions stored on a computer-readable storage medium and executable by one or more processors of one or more computing devices. When executed by the one or more processors, the computer-executable instructions of system 100 can cause a computing device to perform the methods described herein. Alternatively, components 102-108 can comprise hardware, such as a special purpose processing device to perform a certain function or group of functions. Additionally or alternatively, components 102-108 can comprise a combination of computer-executable instructions and hardware.

As mentioned above, and as shown in FIG. 1, system 100 can include content item manager 102. Content item manager 102 can provide, manage, and/or control access to one or more content items associated with a user and/or client device. In particular, content item manager 102 can receive or otherwise obtain a content item from a client device. For example, content item manager 102 can receive an upload of one or more content items from a client device over a network. In some embodiments, content item manager 102 can maintain the received content item such that the client device need not maintain the content item locally on the client device. Alternatively, a client device can maintain a local copy of the content item in addition to uploading the content item to system 100.

Additionally, content item manager 102 can provide a user access to a content item for viewing, editing, sharing, or other reason. In particular, content item manager 102 can provide access to a content item or collection of content items to one or more client devices for viewing, editing, sharing, or some other reason. Content item manager 102 can further provide and/or restrict access to any content items based on permissions, identification of a particular device and/or user, or other criteria associated with a particular content item and/or collection of content items.

In some embodiments, content item manager 102 can provide and/or control access to data associated with content items. In particular, an application on a client device may require access to certain data associated with a content item, such as the size, resolution, dimensions, or other features or characteristics of the content item. For example, content item manager 102 can provide access to information associated with a particular content item based on identification and/or permissions granted to various applications, users, and/or devices.

As mentioned above, system 100 can include reduced resolution content item manager 104 having access to one or more content items. Reduced resolution content item manager 104 can generate one or more reduced resolution content items from a content item. For example, reduced resolution content item manager 104 can transcribe a content item into a plurality of reduced resolution content items having a lower resolution than the original content item. Additionally, reduced resolution content item manager 104 can generate a plurality of reduced resolution content items having a range of resolutions, each lower than the resolution of the content item from which the reduced resolution content items are based. In some embodiments, reduced resolution content item manager 104 can generate reduced resolution content items having particular resolutions or other characteristics based on various applications and/or specifications on one or more client devices.

Reduced resolution content item manager 104 can further provide a user with access to one or more reduced resolution content items. In particular, reduced resolution content item manager 104 can provide one or more of the reduced resolution content items to one or more client devices associated with a user. In some embodiments, reduced resolution content item manager 104 can distribute a plurality of reduced resolution content items to each of multiple client devices associated with a user. Alternatively, reduced resolution content item manager 104 can provide access to one or more of a plurality of reduced resolution content items to a plurality of users.

In some embodiments, reduced resolution content item manager 104 can transcribe multiple reduced resolution content items based on a higher resolution content item and provide each of the plurality of reduced resolution content items to a plurality of client devices. In particular, reduced resolution content item manager 104 can generate a plurality of reduced resolution content items based on preferences of a user, client device specifications, or other factors associated with one or more client devices, and download each of multiple reduced resolution content items to each of multiple client devices.

As mentioned above, system 100 can further include edit manager 106. Edit manager 106 can receive one or more edits associated with a content item. In particular, edit manager 106 can receive one or more edits made to a reduced resolution content item from a user at a client device. In some embodiments, receiving an edit can include receiving information associated with a modification or change to a reduced resolution content item performed on a client device. For example, a user can perform an edit to a particular reduced resolution content item and provide information associated with the edit to the edit manager 106.

Further, edit manager 106 can apply one or more modifications associated with a content item to one or more of the reduced resolution content items produced from the content item. In particular, edit manger 106 can apply a received edit from a client device and apply the edit to each of the generated reduced resolution content items. For example, edit manager 106 can apply the edit to each of the reduced resolution content items previously distributed to one or more users. In some embodiments, edit manager 106 only applies edits to copies of the content item (e.g., reduced resolution content items), and not necessarily to the original content item itself. Alternatively, in some embodiments, edit manager 106 can apply the edits to reduced resolution content items as well as an original content item.

As mentioned above, system 100 can include database manager 108. Database manager 108 can manage storage and/or access to content items on one or more databases accessible to system 100. In particular, when system 100 receives a content item and generates reduced resolution content items based on the content item, database manager 108 can store the content item or copy of the content item having a similar resolution of the content item on a database. Further, database manager 108 can store each of the reduced resolution content items on a database accessible to system 100 and/or one or more client devices.

Further, upon receiving one or more edits from user and/or associated client device, database manager 108 can store edits in the database. In particular, database manager 108 can store information about edits alongside the content item and/or reduced resolution content items in the database. In some embodiments, database manager 108 can store edits associated with a content item and/or collection of content items in a database without saving any edited versions of the content item or associated reduced resolution content items in the database. Alternatively, database manager 108 can store and/or manage access to edited versions of reduced resolution content items and/or the original content item in the database.

Figure 2:
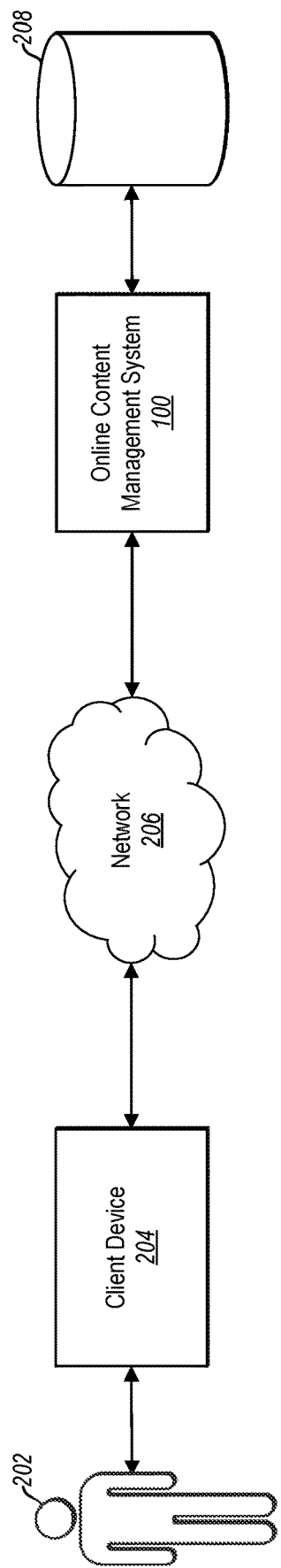
FIG. 2 illustrates a block diagram of an environment for implementing the system of FIG. 1 in accordance with one or more embodiments of the present disclosure.

FIG. 2 illustrates a block diagram of a specific example implementation of system 100. In particular, FIG. 2 illustrates user 202 and associated client device 204, which may be in communication with online content management system 100 (or simply "system") via network 206. In some embodiments, functions and features described herein can be performed entirely on system 100. Alternatively, client device 204 can perform one or more of the functions described with respect to system 100. In some embodiments, system 100 and client device 204 can perform a combination of different functions described herein.

In some embodiments, client device 204 can obtain or otherwise access content items. For example, client device 204 can capture or otherwise create content items (e.g., using a camera and/or microphone). Additionally or alternatively, client device 204 can receive content items from system 100 or other device.

In some embodiments, client device 204 can provide access to a content item to system 100. In particular, client device 204 can upload one or more content items to system 100 over network 206 to be stored on database 208. Additionally, client device 204 can upload one or more collections of content items, including all content items of a particular folder or client device 204 to system 100. In this way, system 100 can obtain access to any and/or all content items stored and/or indexed on a particular client device 204.

Additionally client device 204 can receive edits to one or more content items from user 202. In particular, user 202 can perform one or more modifications to a content item on an interface of client device 204. For example, user 202 can modify a content item or a gallery of content items accessible to client device 204. Client device 204 can further provide the edit and/or information about the edit to system 100 over network 206.

As described above in connection with FIG. 1, system 100 can receive one or more content items from client device 204 and generate one or more reduced resolution content items based on the content item. Further, system 100 can store the content item and reduced resolution content items in database 208 and further provide copies of the reduced resolution content items to client device 204. In some embodiments, system 100 can provide the reduced resolution content items to multiple client devices associated with a particular user. Alternatively, system 100 can provide the reduced resolution content items to multiple client devices associated with different users.

Additionally, system 100 can receive an edit from client device 204 applied by user 202. In particular, user 202 can apply edits to a reduced resolution content item provided to client device 204 by system 100. For example, when user 202 performs one or more edits on client device 204, those edits may be applied to a reduced resolution content item rather than the original content item. System 100 can receive the edit and apply the edit to each of the plurality of reduced resolution content items stored on database 208 as well as any reduced resolution content items distributed to client device 204 or other client devices accessible to user 202. In some embodiments, system 100 can distribute edit information to client device 204 for client device 204 to apply to other reduced resolution content items on client device 204 and/or other devices.

Database 208 can provide a storage of content items accessible to system 100. In particular, system 100 can store content items and reduced resolution content items on database 208. In some embodiments, client device 204 can access and/or store content items and reduced resolution content items on database 208. In some embodiments, database 208 can include storage on system 100. Alternatively, database 208 can include one or more databases or storage accessible to system 100 and/or client device 204. In some embodiments, database 208 can include storage on a remote database from system 100.

Figure 3:
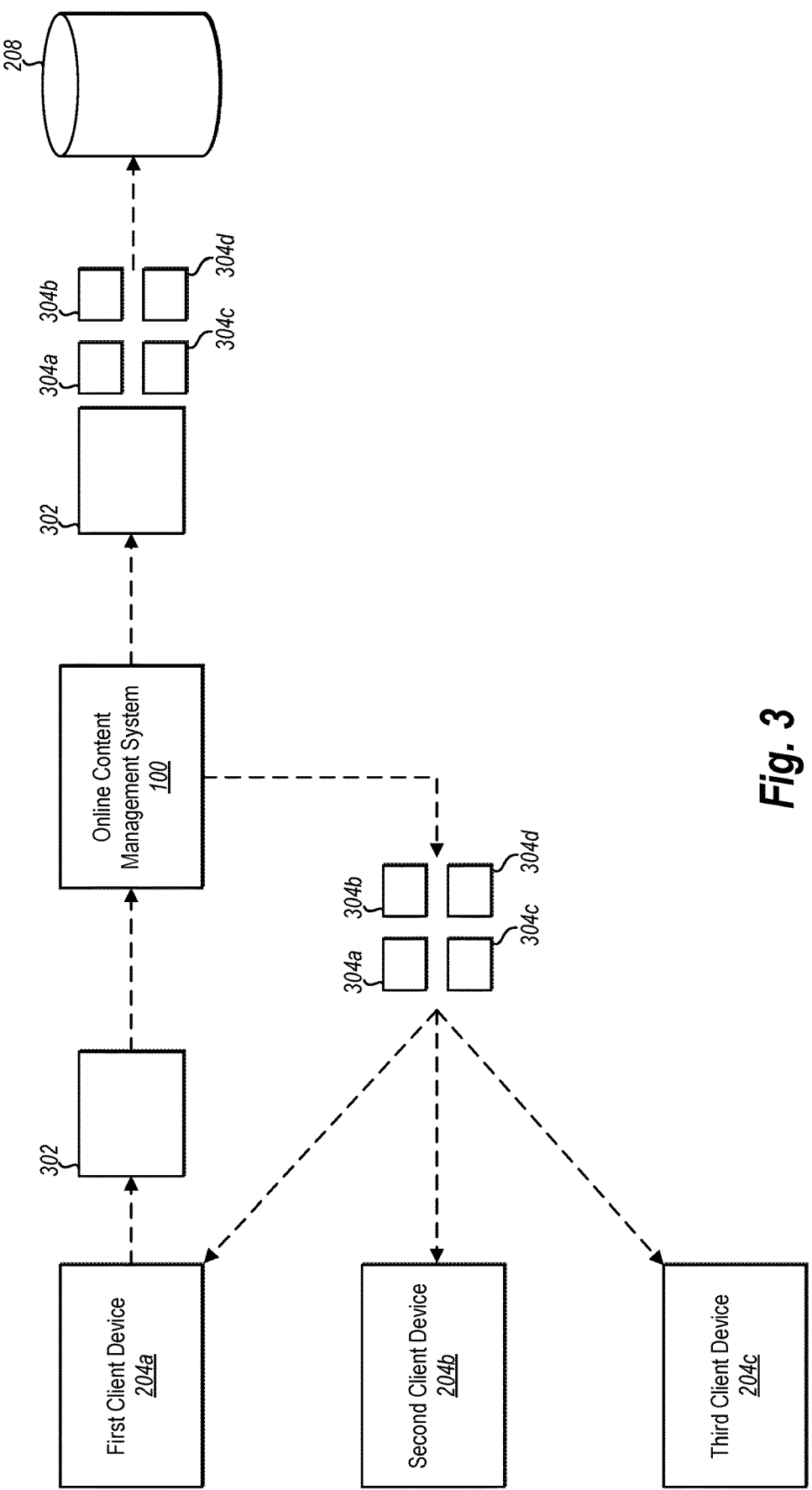
FIG. 3 illustrates a block diagram of an environment for accessing a content item in accordance with one or more embodiments of the present disclosure.

FIG. 3 illustrates a block diagram of an exemplary environment for accessing a content item in accordance with one or more embodiments of the present disclosure. In particular, FIG. 3 illustrates first client device 204a in communication with online content management system 100. Additionally, FIG. 3 illustrates plurality of client devices 204a-c, each in communication with system 100. In some embodiments, fewer or additional client devices 204 can communicate with system 100.

As mentioned above, one of client devices 204a-c can obtain or otherwise access content item 302. For example, as illustrated in FIG. 3, first client device 204a can obtain content item 302 using a camera, microphone, or other data capturing device on first client device 204a. For example, first client device 204a can be used to take a photo and generate content item 302. Alternatively, first client device 204a can receive content item 302 from another device.

First client device 204a can provide access to content item 302 to system 100. For example, as illustrated in FIG. 3, first client device 204a can upload content item 302 to system 100. In some embodiments, content item 302 can be an original content item 302 having a high resolution or an original resolution when obtained by first client device 204a. Additionally, in some embodiments, first client device 204a can provide access to a collection or gallery of content items to system 100.

Upon receiving content item 302, system 100 can generate reduced resolution content items 304 based on content item 302. In particular, reduced resolution content items 304 can include a plurality of reduced resolution content items 304, each based on original content item 302. For example, as illustrated in FIG. 3, system 100 can generate four reduced resolution content items 304a-d. Each of reduced resolution content items 304a-d can have a lower resolution than content item 302. Further, each of reduced resolution content items 304a-d can have varying resolutions from each other. In some embodiments system 100 can generate more or fewer reduced resolution content items 304.

As mentioned above, system 100 can generate any number of reduced resolution content items 304 having varying levels of resolutions based on client devices 204. In particular, system 100 can generate one or more of reduced resolution content items 304 based on properties and/or specifications of one or more client devices 204. For example, in determining how many reduced resolution content items 304 to generate and respective resolutions for each reduced resolution content item 304, system 100 can consider properties of one or more client devices 204. For example, system 100 can generate reduced resolution content items 304 having different resolutions based on display specifications and/or screen dimensions of each client device 204. Additionally, system 100 can determine resolutions and/or other features of reduced resolution content items 304 based on different applications on one or more client devices 204. In some embodiments, system 100 can generate reduced resolution content items 304 having a range of predetermined resolutions to accommodate a range of client devices 204 having different properties.

System 100 can store content item 302 and one or more reduced resolution content items 304 in database 208. In particular, upon receiving content item 302 and generating reduced resolution content items 304, system 100 can store, index, or otherwise manage a digital storage of content items 302 and reduced resolution content items 304 on database 208. In some embodiments, system 100 can store content item 302 and reduced resolution content items 304 on database 208 located within system 100. Alternatively, system 100 can store content item 302 and reduced resolution content items 304 on database 208 located on one or more separate devices from system 100.

In addition to storing content item 302 and reduced resolution content items 304 on database 208, system 100 can further provide a user with access to reduced resolution content items 304. In particular, system 100 can provide reduced resolution content items 304 to one or more client devices 204. For example, as illustrated in FIG. 3, system 100 can download reduced resolution content items 304a-d to first client device 204a, second client device 204b, and third client device 204c. In some embodiments, system 100 can provide identical copies of plurality of reduced resolution content items 304 to client devices 204. Thus, each of plurality of client devices 204 can receive the same reduced resolution content items 304 as reduced resolution content items 304 provided to other client devices 204. Alternatively, system 100 can provide access to different reduced resolution content items 304 to each of plurality of client devices 204.

Upon receiving reduced resolution content items 304, a user can access one of reduced resolution content items 304 using one of client devices 204. For example, a user can access first reduced resolution content item 304a using first client device 204a. Alternatively, a user can access any one of reduced resolution content items 304a-d using any one of client devise 204a-c.

To facilitate user access of reduced resolution content items 304, system 100 can select one of reduced resolution content items 304 for the user to access. In particular, a user can select an icon corresponding to original content item 302, and, rather than presenting original content item 302 at its full resolution to the user, system 100 can select one of reduced resolution content items 304 to present to the user on first client device 204a. For example, while the user may not see a difference locally between content item 302 and reduced resolution content items 304, system 100 can fetch a particular reduced resolution content item 304 based on the display, bandwidth, or other specification of client device 204 or network between system 100 and client device 204. Alternatively, selecting and fetching reduced resolution content item 304 can be performed by client device 204, rather than system 100.

In determining which reduced resolution content item 304 to access, system 100 can consider a variety of factors. For example, system 100 can fetch a particular reduced resolution content item 304 based on specifications of client device 204, such as a display size of client device 204. In another example, system 100 can fetch a particular reduced resolution content item 304 based on a user preference. Other factors can include processing power of client device 204, bandwidth or quality of a connection between client device 204 and system 100 or other factors affecting the access speed and/or display quality of reduced resolution content item 304.

Alternatively, after distribution of reduced resolution content items 304 to client devices 204, accessing one or more reduced resolution content items 304 can be performed locally to client device 204. For example, as illustrated in FIG. 3, first client device 204a can receive each of reduced resolution content items 304 from system 100. Subsequently, even when first client device 204a has no network access to system 100 or database 208, first client device 204a can access any one of reduced resolution content items 304 stored locally on first client device 204a without querying system 100 or otherwise requiring online access to a network. Alternatively, one or more client devices 204a can also access reduced resolution content items 304 from system 100 (e.g., over a network).

Figure 4:
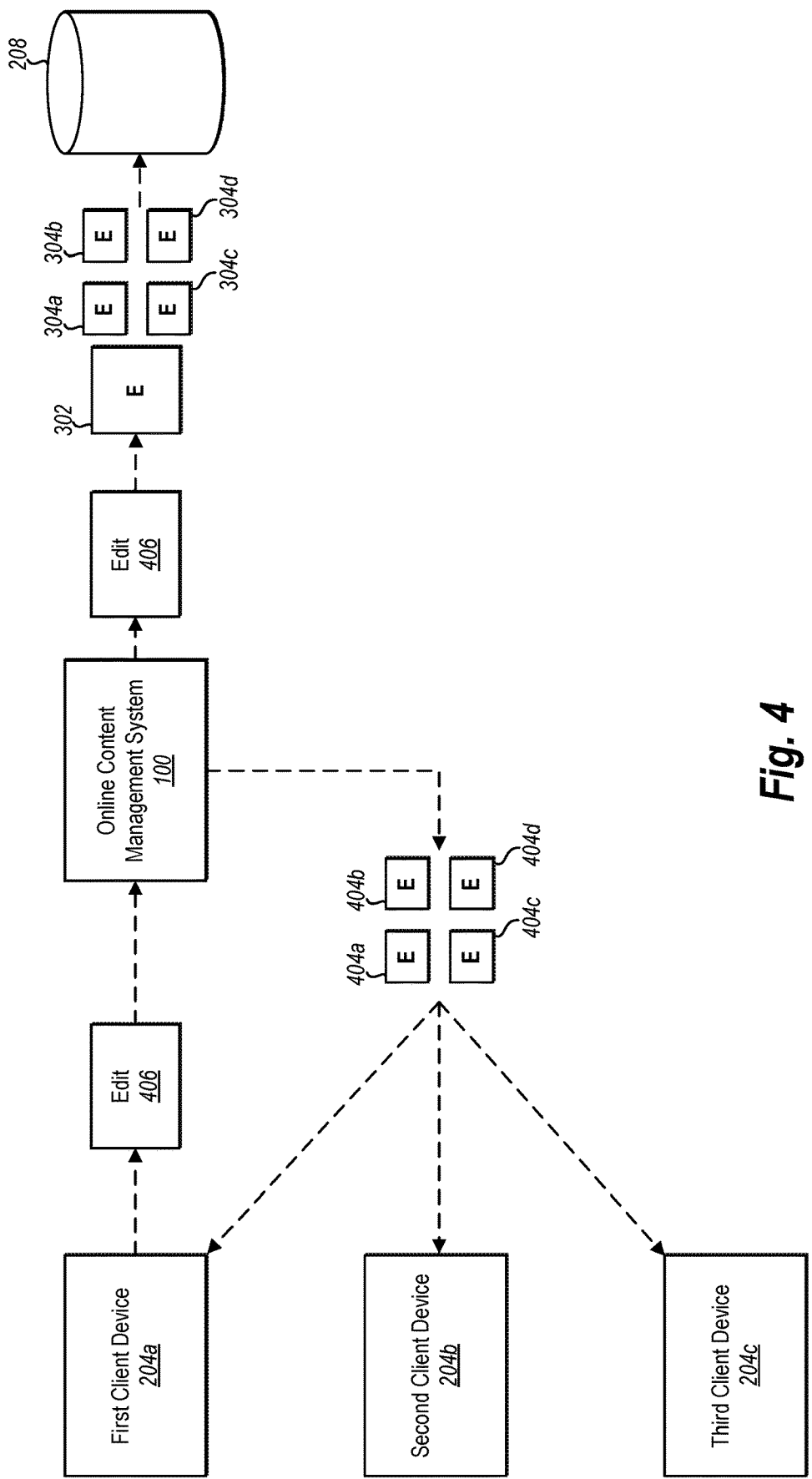
FIG. 4 illustrates a block diagram of an environment for editing a content item in accordance with one or more embodiments of the present disclosure.

FIG. 4 illustrates a block diagram of an environment for applying edits to a content item in accordance with one or more embodiments of the present disclosure. Similar to FIG. 3, FIG. 4 illustrates client devices 204a-c in communication with system 100. As illustrated in FIG. 4, system 100 can communicate with three client devices 204a-c, each having access to reduced resolution content items 304. Alternatively, more or fewer client devices 204 can be in communication with system 100.

As described above in connection with FIG. 3, each client device 204 can have access to reduced resolution content items 304. Further, each client device 204 can perform modifications or other changes to one or more of reduced resolution content items 304. For example, first client device 204a can apply one or more changes to reduced resolution content item 304. In particular, first client device 204a can apply edits to reduced resolution content items 304 using one or more applications on first client device 204a. In some embodiments, a user can apply changes to reduced resolution content item 304 using any of client devices 204 having access to reduced resolution content items 304.

When a user modifies or otherwise changes one of reduced resolution content items 304, it may appear to a user that the changes are applied to original content item 302 rather than reduced resolution content item 304. In particular, first client device 204a can provide a user the ability to modify reduced resolution content item 304 while appearing to the user that the modifications are being performed on original content item 302. For example, when a user instructs first client device 204a to open content item 302, system 100 or first client device 204a can fetch reduced resolution content item 304 rather than original content item 302 for the user to access and/or modify.

Upon making a modification to reduced resolution content item 304, user can provide edit 406 to system 100. For example, as illustrated in FIG. 4, first client device 204a can upload edit 406 to system 100. Providing edit 406 to system 100 can include providing information associated with modifications, additions, deletions, or other changes applied to reduced resolution content item 304 using first client device 204a. For example, first client device 204a can provide edit 406, including information to identify modifications made to reduced resolution content item 304, such that system 100 can identify specific changes to reduced resolution content item 304 made by the user.

System 100 can receive edit 406 from any one of client devices 204. For example, as illustrated in FIG. 4, system 100 can receive edit 406 from first client device 204a. In some embodiments, system 100 can receive edit 406 from any of client devices 204 that have been used by user to implement one or more modifications to reduced resolution content item 304. Thus, system 100 can receive one or more edits 406 from any of client devices 204a-c. In some embodiments, system 100 can receive edit 406 from client device 204 by way of an upload from client device 204. Alternatively, system 100 can remotely access edit 406 from client device 204 over a network.

System 100 can apply edit 406 to content item 302 and reduced resolution content items 304 stored on database 208. In particular, system 100 can store edit 406 in database 208 alongside original content item 302 and reduced resolution content items 304 transcribed from original content item 302. In some embodiments, system 100 can store edit 406 in database 208 without modifying original content item 302 and reduced resolution content items 304. Alternatively, system 100 can apply edit 406 to each of reduced resolution content items 304 and original content item 302.

Additionally, system 100 can assemble a history of edits 406 applied to one or more reduced resolution content items 304. For example, each time a user modifies reduced resolution content item 304, system 100 can assemble each edit 406 and maintain a history of edits 406 associated with content item 302 and any associated reduced resolution content items 304. Further, system 100 can assembly and manage a history of edits 406 associated with any of reduced resolution content items 304 performed by any of client devices 204. In some embodiments, modifications applied to any of reduced resolution content items 304 can System 100 can store edit 406 on database 208. In particular, system 100 can store edit 406 with content item 302 and reduced resolution content items 304 previously stored on database 208. In some embodiments, system 100 can store edit 406 on database 208 without modifying content item 302 and reduced resolution content items 304. For example, system 100 can store edit 406 on database in conjunction with content item 302 and reduced resolution content items 304. Further, in some embodiments, system 100 can apply a flag, index, or other indicator alongside content item 302 and reduced resolution content items 304 to indicate that one or more edits 406 are applicable to content item 302 and/or reduced resolution content items 304.

In some embodiments, system 100 can apply edit 406 to content item 302 and reduced resolution content items 304 on database 208. For example, system 100 can apply edits universally to some or all of reduced resolution content items 304 and content item 302 and store the modified versions of content item 302 and reduced resolution content items 304 on database 308. In some embodiments, system 100 can apply edit 406 only to reduced resolution content items 304 without also applying edit 406 to content item 302. Alternatively, system 100 can apply edit 406 to both original content item 302 and reduced resolution content items 306.

In addition to storing and applying edit 406 to content item 302 and reduced resolution content items 304 on database 208, system 100 can further apply edit 406 to one or more reduced resolution content items 304 on client devise 204. For example, as illustrated in FIG. 4, system 100 can provide updated reduced resolution content items 404 to client devices 204 to replace any previous versions of reduced resolution content items 304 currently stored on client devices 204. In some embodiments, system 100 can send each updated reduced resolution content item 404 to each client device 204 so that each of first client device 204a, second client device 204b, and third client device 204c receive each updated reduced resolution content item 404a-d. Alternatively, system 100 can send different updated reduced resolution content items 404 to each of client devices 204a-c.

In some embodiments, rather than send updated reduced resolution content items 404 to client devices 204, system 100 can send edit 406 to each client device 204. In particular, system 100 can provide edit 406 to client devices 204 for each client device 204 to apply the edit 406 locally to the reduced resolution content items 304 previously provided to client devices 204 from system 100. Alternatively, system 100 can remotely update each reduced resolution content item 404 on client devise 204 without requiring local application of edit 406 on the part of client devices 204.

In some embodiments, system 100 can apply edit 406 on reduced resolution content items 304 stored on system 100 or database 208 without providing edit 406 and/or updated reduced resolution content items 404 to client devices 204. In particular, rather than provide updated reduced resolution content items 404 and/or edit 406 to be applied locally on client devices 204, system 100 can apply edit 406 to reduced resolution content items 304 to be accessed remotely from client devices 204. For example, rather than having updated reduced content items 404 stored locally on client devices 204, client devices 204 can access updated reduced resolution content items 404 over a network without using as much bandwidth as would be necessary to access original content item 302 over the network.

Figure 5:
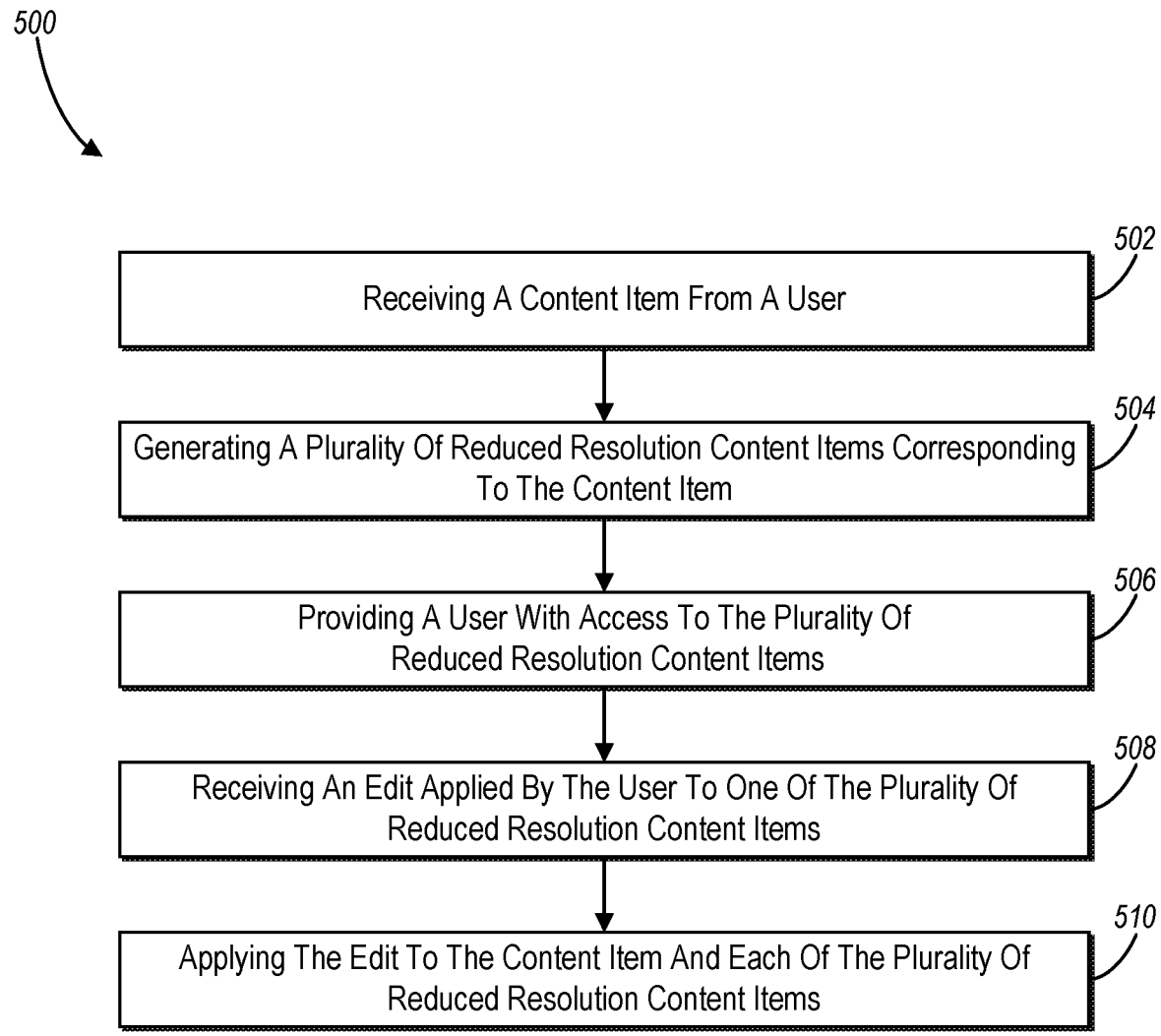
FIG. 5 illustrates a flow diagram of a method of managing content items in accordance with one or more embodiments of the present disclosure.

FIG. 5 illustrates a flowchart of one exemplary method 500 of managing content items in accordance with one or more principles described herein. While FIG. 5 illustrates example steps according to one embodiment, other embodiments may omit, add to, reorder, and/or modify any of the steps shown in FIG. 5. One or more steps shown in FIG. 5 may be performed by any of the components illustrated in system 100 illustrated in FIG. 1. Further, one or more steps of method 500 can be performed by client device 204, online content management system 100, or a combination of both.

Method 500 includes step 502, which may include receiving content item 302 from client device 204. For example, step 502 can include receiving one or more photos, videos, audio files, documents, streaming content, or other digital data. In particular, as described in more detail herein, content item manager 102 of system 100 can receive content item 302 from user 202 by way of client device 204. For example, system 100 can receive content item 302 from a user account associated with client device 204.

Additionally, method 500 includes step 504, which may include generating plurality of reduced resolution content items 304 corresponding to content item 302. For example, reduced resolution content item manager 104 of system 100 can generate plurality of reduced resolution content items 304 corresponding to original content item 302. In some embodiments, reduced resolution content items 304 can be copies of content item 302 having a lower resolution than content item 302. Further, in some embodiments, each of reduced resolution content items 304 can have a resolution based on one or more client devices 204 and/or applications on one or more client devices 204. Alternatively, plurality of reduced resolution content items 304 can have resolutions based on user preferences or a predetermined range of resolutions having a range of applications.

Method 500 further includes step 506, which may include providing user 202 with access to plurality of reduced resolution content items 304. For example, reduced resolution content item manager 104 of system 100 can provide access to plurality of reduced resolution content items 304 via one or more client devices 204 or user accounts accessible to and/or associated with user 202. In some embodiments, providing user 202 with access to reduced resolution content items 304 can include providing one or more copies of each reduced resolution content item 304 to user 202. Additionally, providing user 202 with access to reduced resolution content items 304 can include providing access to remote database (e.g., database 208) to user 202. In some embodiments, user 202 can have access to reduced resolution content items 304 by way of an online connection. Alternatively, user 202 can have local access to reduced resolution content items 304 by way of local storage on client device 204.

Method 500 further includes step 508, which may include receiving edit 406 applied by user 202 to one of plurality of reduced resolution content items 304. For example, edit manager 106 of system 100 can receive edit 406 made to reduced resolution content item 304 by user 202 using one or more client devices 204. In some embodiments, receiving edit 406 can include receiving information associated with a change to reduced resolution content item 304 made by user 202. Additionally or alternatively, receiving edit 406 can include receiving a modified version of one or more reduced resolution content items 304 from user 202.

As described above, edit 406 can include any information associated with a modification, addition, deletion, or other change applicable to content item 302 and/or reduced resolution content item 304. In some embodiments, edit 406 can include a modification to one of plurality of reduced resolution content items 304 applied locally at client device 204 by user 202. In some embodiments, the modification to reduced resolution content item 304 can be applied locally at client device 204 without online access.

Method 500 further includes step 510, which may include applying edit 406 to content item 304 and each of plurality of reduced resolution content items 304. For example, edit manager 106 of system 100 can apply edit 406 to one or more reduced resolution content items 304 distributed to client devices 204. Additionally, database manager 108 of system 100 can apply edit 406 to one or more reduced resolution content items 304 stored on database 208. In some embodiments, applying edit 406 can include storing edit 406 on database 208 in conjunction with content item 302 and reduced resolution content items 304. Additionally, applying edit 406 can include providing edit 406 (e.g., information associated with edit 406) to user 202 to be applied on client device 204 associated with user 202. Additionally or alternatively, applying edit 406 can include proving updated reduced resolution content item 404 (e.g., based on edit 406) to user 202.

Furthermore, while not illustrated in FIG. 5, method 500 can also include providing plurality of users 202 with access to reduced resolution content items 304. Further, receiving edit 406 can include receiving edit 406 from any one of plurality of users 202. Additionally, providing users 202 with access to reduced resolution content items 304 can include providing access to each of plurality of users 202 to modify one or more of reduced resolution content items 304. Moreover, applying edit 406 may include providing edit 406 to a first user from plurality of users 202 to be distributed to one or more other users from plurality of users 202.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
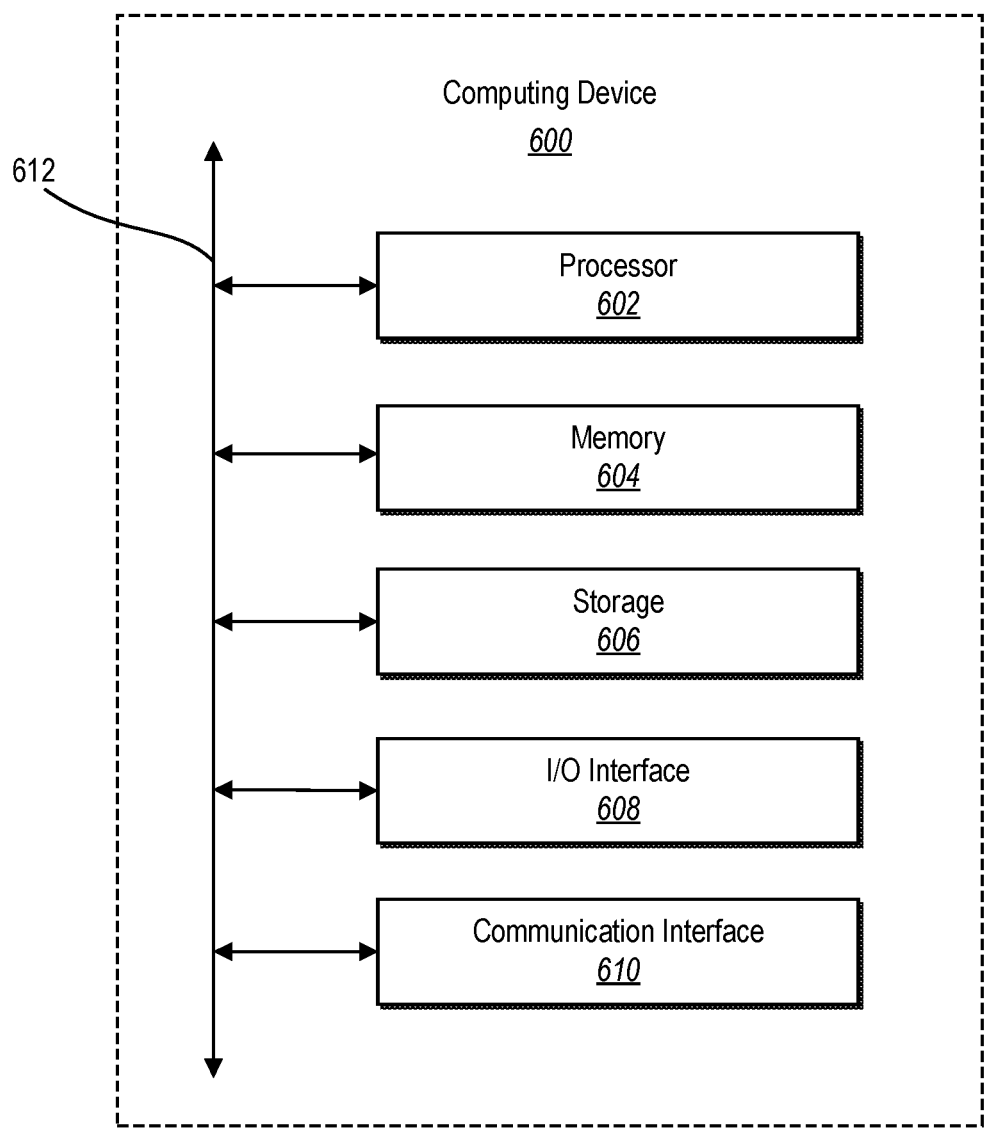
FIG. 6. illustrates a block diagram of an exemplary computing device in accordance with one or more embodiments of the present disclosure.

FIG. 6 illustrates a block diagram of exemplary computing device 600 that may be configured to perform one or more of the processes described above. One will appreciate that online content management system 100 and client device 204 each may include one or more computing devices in accordance with implementations of the computing device 600. As shown by FIG. 6, computing device 600 can comprise processor 602, memory 604, storage device 606, I/O interface 608, and communication interface 610, which may be communicatively coupled by way of communication infrastructure 612. While an exemplary computing device 600 is shown in FIG. 6, the components illustrated in FIG. 6 are not intended to be limiting. Additional or alternative components may be used in other embodiments. Furthermore, in certain embodiments, computing device 600 can include fewer components than those shown in FIG. 6. Components of computing device 600 shown in FIG. 6 will now be described in additional detail.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage device 606 and decode and execute them. In particular embodiments, processor 602 may include one or more internal caches for data, instructions, or addresses. As an example and not by way of limitation, processor 602 may include one or more instruction caches, one or more data caches, and one or more translation lookaside buffers (TLBs). Instructions in the instruction caches may be copies of instructions in memory 604 or storage 606.

Memory 604 may be used for storing data, metadata, and programs for execution by the processor(s). Memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 606 includes storage for storing data or instructions. As an example and not by way of limitation, storage device 606 can comprise a non-transitory storage medium described above. Storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to computing device 600. In particular embodiments, storage device 606 is non-volatile, solid-state memory. In other embodiments, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 608 allows a user to provide input to, receive output from, and otherwise transfer data to and receive data from computing device 600. I/O interface 608 may include a mouse, a keypad or a keyboard, a touch screen, a camera, an optical scanner, network interface, modem, other known I/O devices or a combination of such I/O interfaces. I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 608 is configured to provide graphical data to a display for presentation to a user. The graphical data may be representative of one or more graphical user interfaces and/or any other graphical content as may serve a particular implementation.

Communication interface 610 can include hardware, software, or both. In any event, communication interface 610 can provide one or more interfaces for communication (such as, for example, packet-based communication) between computing device 600 and one or more other computing devices or networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 612 may include hardware, software, or both that couples components of computing device 600 to each other. As an example and not by way of limitation, communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 7:
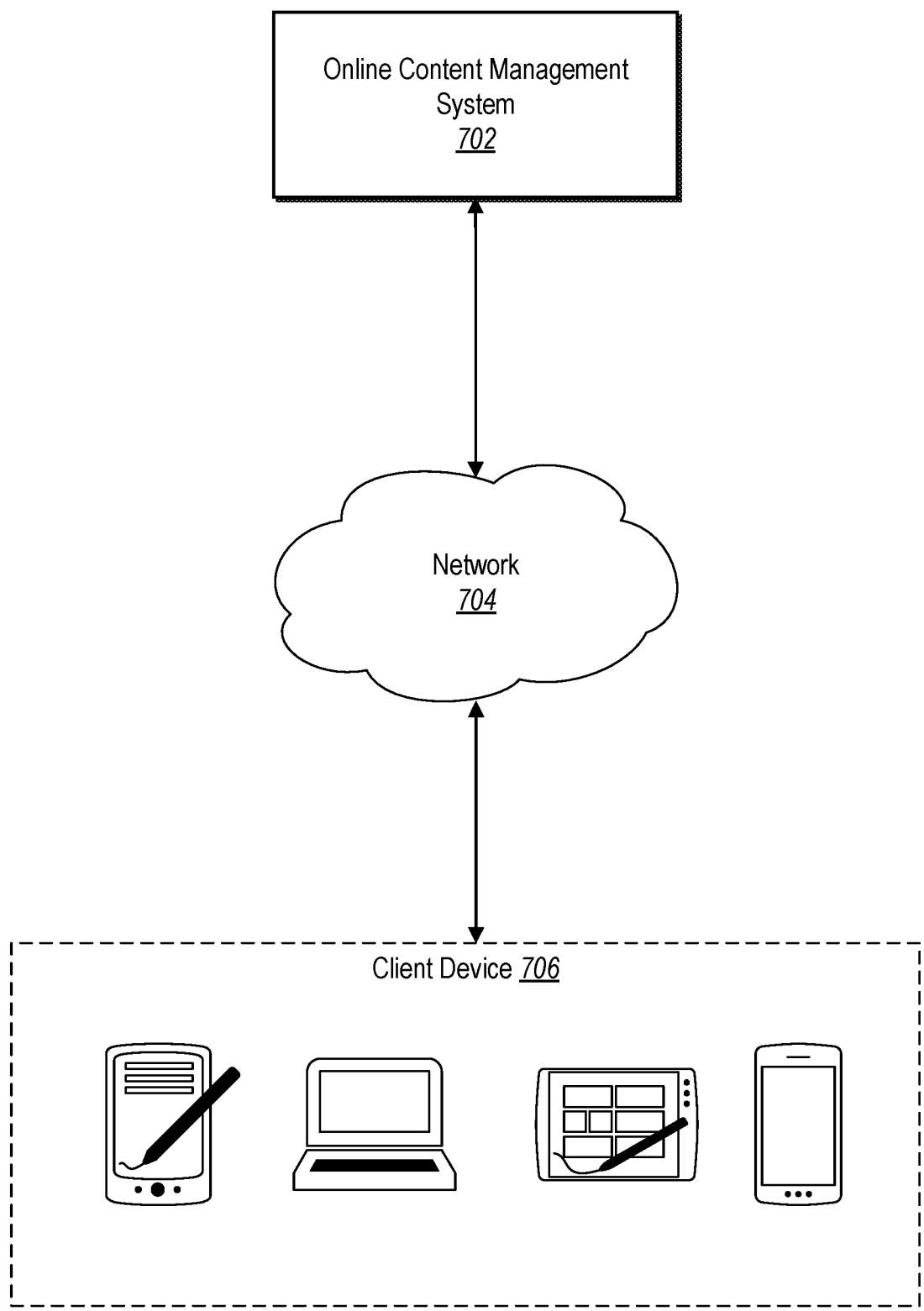
FIG. 7 illustrates a network environment of an online content management system in accordance with one or more embodiments of the present disclosure.

FIG. 7 is a schematic diagram illustrating an environment within which one or more embodiments of an online content management system 100 (or simply "system") can be implemented. For example, online content management system 702 may generate, store, manage, receive, and send content items. For example, online content management system 702 may receive a content item from client device 706 by way of network 704. In particular, online content management system 702 can store and manage a collection of content items. Online content management system 702 can manage the sharing of content items between computing devices associated with a plurality of users. For instance, online content management system 702 can facilitate a user sharing a content item with another user of the online content management system.

In particular, online content management system 702 can manage synchronizing content items across multiple client devices 706 associated with one or more users. For example, user may edit a content item using client devices 706. The online content management system 702 can cause client device 706 to send the edited content item to online content management system 702. Online content management system 702 then synchronizes the edited content item on one or more additional computing devices.

In addition to synchronizing content items across multiple devices, one or more embodiments of the online content management system can provide an efficient storage option for users that have large collections of content items. For example, the online content management system can store a collection of content items on online content management system 702, while the client device 706 only stores reduced-sized versions of the content items. A user can navigate and browse the reduced-sized versions (e.g., a thumbnail of a digital photo) of the content items on client device 706. In particular, one way in which a user can experience content items is to browse the reduced-sized versions of the content items on client device 706.

Client device 706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 706 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 704.

Network 704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 706 may access online content management system 702.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
generating, by a content management system comprising at least one server device, a plurality of reduced resolution content items corresponding to a content item, wherein each of the plurality of reduced resolution content items has a different resolution;
providing, to a client device associated with a user account, the plurality of reduced resolution content items for storage on the client device;
maintaining, by the content management system and in association with the user account, the content item and the plurality of reduced resolution content items;
receiving, from the client device, an edit applied to a first reduced resolution content item from the plurality of reduced resolution content items stored on the client device; and
applying the edit to the content item and the plurality of reduced resolution content items maintained by the content management system.

2. The method of claim 1, wherein the content item comprises a digital photo or a digital video.

3. The method of claim 1, wherein each of the plurality of reduced resolution content items comprises a copy of the content item having a lower resolution than the content item.

4. The method of claim 1, wherein the plurality of reduced resolution content items comprises a subset of reduced resolution content items specific to the client device.

5. The method of claim 4, wherein the plurality of reduced resolution content items are based on display specifications of the client device.

6. The method of claim 1, wherein the plurality of reduced resolution content items are specific to an application running on the client device.

7. The method of claim 1, wherein the plurality of reduced resolution content items are based on one or more preferences associated with the user account.

8. The method of claim 1, wherein receiving, from the client device, the edit comprises receiving data representative of a change applied at the client device to the first reduced resolution content item.

9. The method of claim 1, wherein receiving, from the client device, the edit comprises receiving a modified version of the first reduced resolution content item from the client device.

10. A system comprising:
at least one processor; and
a non-transitory, computer-readable medium storing instructions that, when executed by the at least one processor, cause the system to:
generate a plurality of reduced resolution content items corresponding to a content item, wherein each of the plurality of reduced resolution content items has a different resolution;
provide, to a client device associated with a user account, the plurality of reduced resolution content items for storage on the client device;
maintain, in association with the user account, the content item and the plurality of reduced resolution content items;
receive, from the client device, an edit applied to a first reduced resolution content item from the plurality of reduced resolution content items stored on the client device; and
apply the edit to the content item and the plurality of reduced resolution content items maintained by the system.

11. The system of claim 10, wherein applying the edit comprises storing the edit in a database in conjunction with the content item and the plurality of reduced resolution content items.

12. The system of claim 10, further comprising instructions that, when executed by the at least one processor, cause the system to send the edit to each of a plurality of client devices associated with the user account.

13. The system of claim 10, further comprising instructions that, when executed by the at least one processor, cause the system to provide an updated copy of each of the plurality of reduced resolution content items to the client device based on the edit.

14. The system of claim 10, wherein the edit comprises a modification to the first reduced resolution content item from the plurality of reduced resolution content items applied locally at the client device.

15. The system of claim 14, wherein the modification is applied locally at the client device without online access at the time of the modification.

16. A non-transitory computer readable medium storing instructions thereon that, when executed by at least one processor, cause at least one computing device to:
generate a plurality of reduced resolution content items corresponding to a content item, wherein each of the plurality of reduced resolution content items has a different resolution;
provide, to a client device associated with a user account, the plurality of reduced resolution content items for storage on the client device;
maintain, in association with the user account, the content item and the plurality of reduced resolution content items;
receive, from the client device, an edit applied to a first reduced resolution content item from the plurality of reduced resolution content items stored on the client device; and
apply the edit to the content item and the plurality of reduced resolution content items maintained by the at least one computing device.

17. The non-transitory computer readable medium of claim 16, the plurality of reduced resolution content items comprises a subset of reduced resolution content items corresponding to the content item, wherein the subset is specific to the client device and based on display specifications of the client device.

18. The non-transitory computer readable medium of claim 16, wherein the instructions, when executed by the at least one processor, further cause the at least one computing device to generate the plurality of reduced resolution content items based on one or more applications on the client device.

19. The non-transitory computer readable medium of claim 16, wherein the instructions, when executed by the at least one processor, further cause the at least one computing device to store the edit in a database in conjunction with the content item and the plurality of reduced resolution content items.

20. The non-transitory computer readable medium of claim 16, wherein the instructions, when executed by the at least one processor, further cause the at least one computing device to:
update each of the plurality of reduced resolution content items based on the edit; and
provide the updated plurality of reduced resolution content items to the client device.

* * * * *